US012688726B2

(12) United States Patent      (10) Patent No.:     US 12,688,726 B2

Videau et al.      (45) Date of Patent:         Jul. 21, 2026

---

(54) METHOD FOR COMPARING TWO DACTYLOGRAMS

(71) Applicant: IDEMIA Public Security France, Courbevoie (FR)

(72) Inventors: Victor Videau, Courbevoie (FR); Laurent Kazdaghli, Courbevoie (FR)

(73) Assignee: IDEMIA Public Security France, Courbevoie (FR)

( * ) Notice: Subject to any disclaimer, the term of this patent is extended or adjusted under 35 U.S.C. 154(b) by 0 days.

(21) Appl. No.: 19/062,109

(22) Filed: Feb. 25, 2025

(65) Prior Publication Data

US 2025/0273008 A1     Aug. 28, 2025

(30) Foreign Application Priority Data

Feb. 26, 2024    (FR) .................................. FR2401840

(51) Int. Cl.
G06V 40/12          (2022.01)
G06V 10/82          (2022.01)

(52) U.S. Cl.
CPC .......... G06V 40/1371 (2022.01); G06V 10/82 (2022.01)

(58) Field of Classification Search
CPC . G06V 40/1371; G06V 10/82; G06V 40/1353
See application file for complete search history.

(56) References Cited

U.S. PATENT DOCUMENTS

| | | | |
|---|---|---|---|
| 2017/0140193 A1* | 5/2017 | Wang | G06F 16/24578 |
| 2017/0140207 A1* | 5/2017 | Zhu | G06V 40/1371 |
| 2023/0104839 A1 | 4/2023 | Alesiani et al. | |

OTHER PUBLICATIONS

French Preliminary Search Report and Written Opinion dated Sep. 9, 2024 in FR2401840 filed on Feb. 26, 2024, 15 pages.
Su et al., "MRA-GNN: Minutiae Relation-Aware Model over Graph Neural Network for Fingerprint Embedding", 2023 IEEE International Joint Conference on Biometrics (IJCB), 2023, 10 pages.
Shi et al., "Towards More Accurate Matching of Contactless Fingerprints with a Deep Geometric Graph Convolutional Network", IEEE Transactions on Biometrics, Behavior, and Identity Science, vol. 5, No. 1, 2023, 10 pages.
Tandon et al., "Transformer based Fingerprint Feature Extraction", 2022 26th International Conference on Pattern Recognition (ICPR), 2022, 7 pages.
Grosz et al., "Minutiae-Guided Fingerprint Embeddings via Vision Transformers", URL:https://arxiv.org/pdf/2210.13994, 2022, 10 pages.
Grosz et al., "AFR-Net: Attention-Driven Fingerprint Recognition Network", IEEE Transactions on Biometrics, Behavior, and Identity Science, vol. 6, No. 1, 2024, 13 pages.

* cited by examiner

*Primary Examiner* — Premal R Patel
(74) *Attorney, Agent, or Firm* — Oblon, McClelland, Maier & Neustadt, L.L.P.

(57)          ABSTRACT

The invention relates to a method for comparing two dactylograms based on lists of their minutiae, said method taking, as input data, a first source matrix MS1 of the coordinates of each minutia in a first list L1 of minutiae of a first dactylogram and a second source matrix MS2 of the coordinates of each minutia in a second list L2 of minutiae of a second dactylogram, and supplying, as output datum, a score regarding a match between the two lists L1, L2 of minutiae.

12 Claims, 4 Drawing Sheets

[Fig. 1]

[Fig. 2]
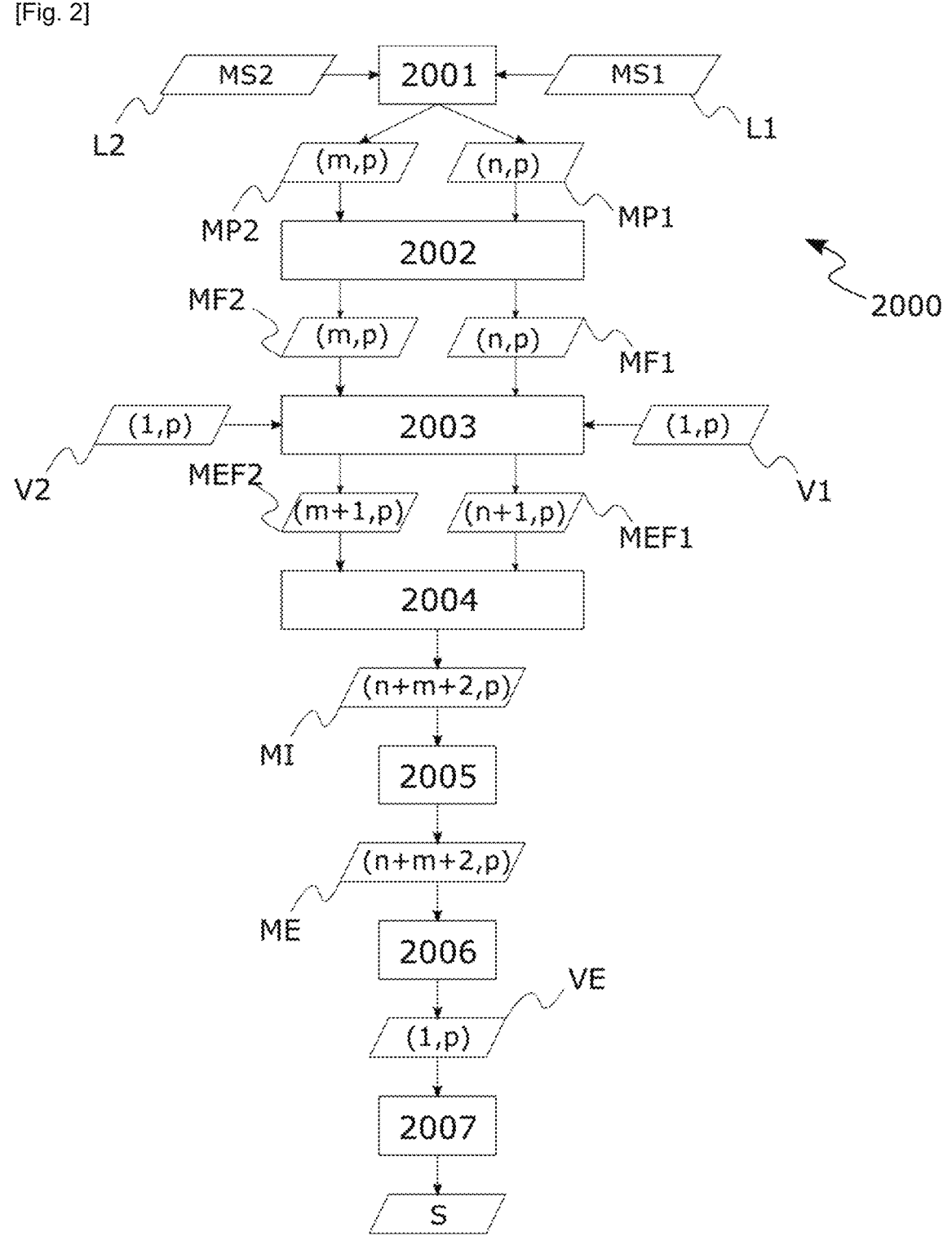

[Fig. 3]
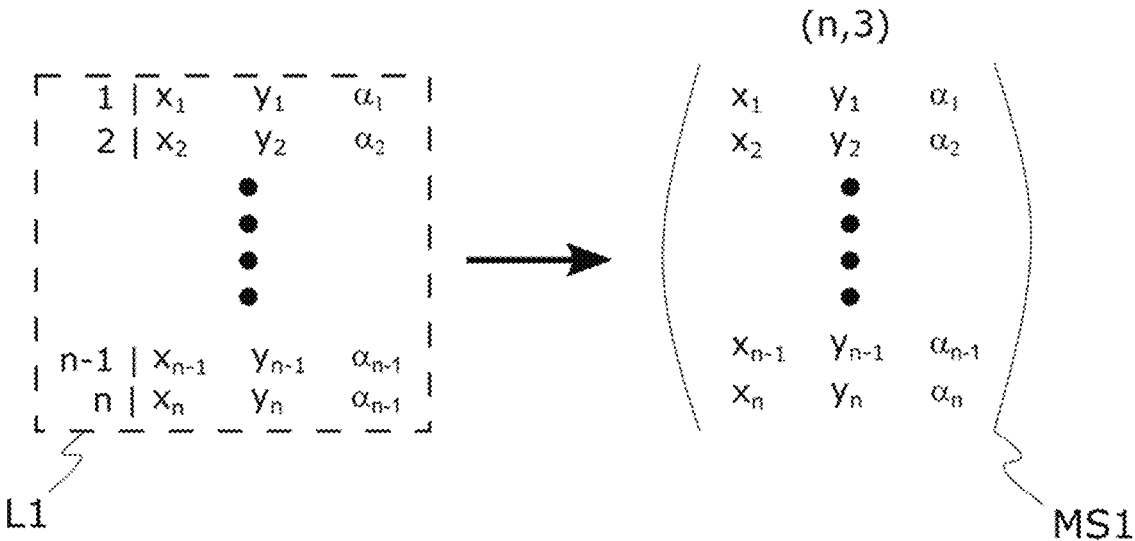
[Fig. 4]
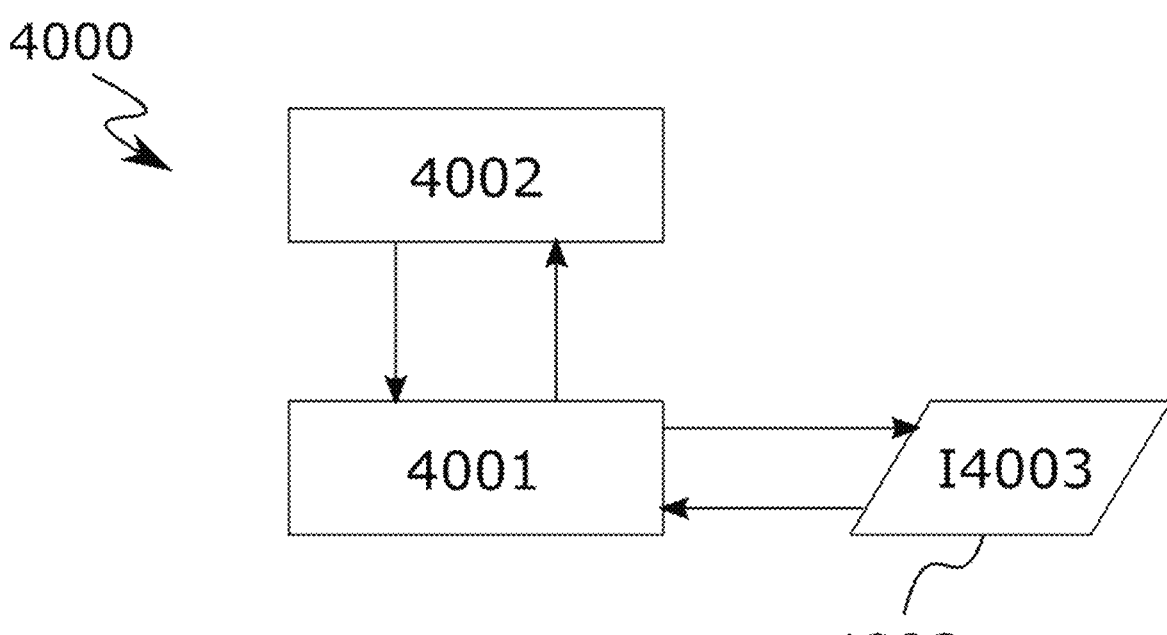

[Fig. 5]
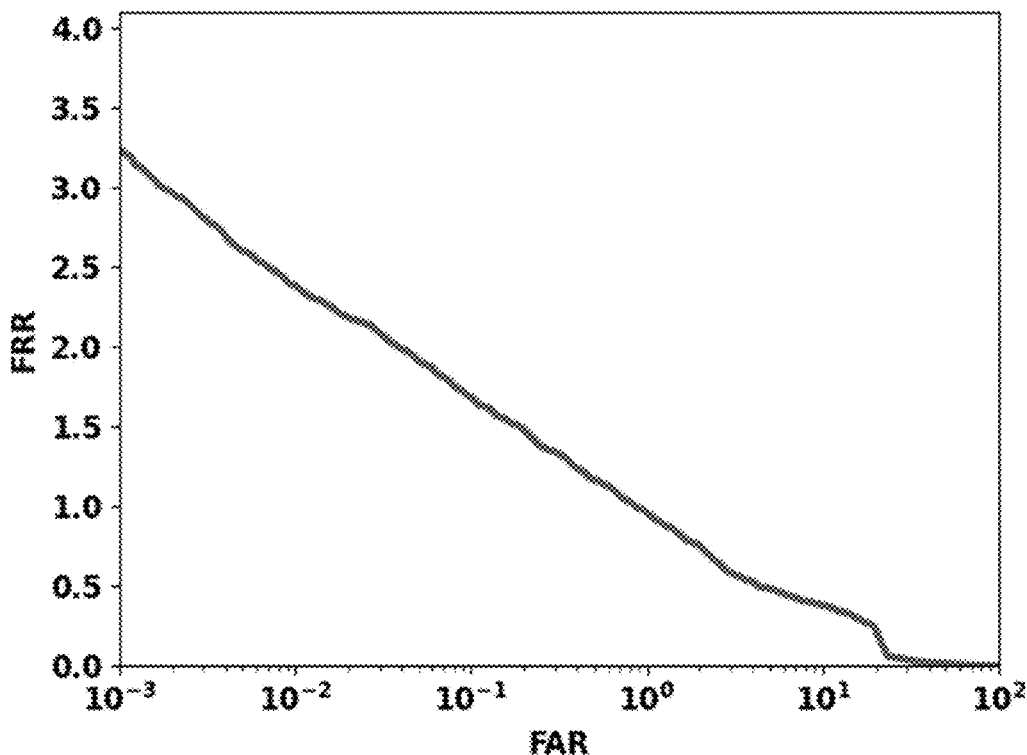

METHOD FOR COMPARING TWO DACTYLOGRAMS

TECHNICAL FIELD

The invention relates to a method and a system for comparing two dactylograms based on lists of their minutiae.

TECHNICAL BACKGROUND

Dactyloscopy is a method for identifying individuals based on the use of dactylograms, which are also known as "fingerprints" and/or "palmprints". This method is used in particular by forensic anthropometry services or by civil identification systems for example in administrative procedures, when crossing borders or when accessing secure locations.

Dactylograms are patterns formed by traces left on surfaces by the dermatoglyphics of the fingers and/or palms of the hands. Dermatoglyphics are the superficial furrows formed on the palms, the soles and the tips of the fingers by the dermal ridges and are arranged in lines or whorls. They are specific to each individual and the patterns that they form constitute an anthropometric "identity card" for said individual by virtue of which they are able to be identified.

Unlike the authentication in which a dactylogram acquired for an individual is compared with a single or a very limited number of reference dactylograms (1:1), identifying an individual based on a dactylogram requires this dactylogram to be compared with numerous other dactylograms acquired beforehand from multiple individuals (1:N) and generally stored in a database. Because dactylograms are patterns with complex features and because the number of comparisons required during an identification may become very high, the identification process may still take a long time, despite the computing resources of data processing devices currently available. In order to reduce the time needed to carry out this operation, it is known practice to classify dactylograms into various classes based on certain morphological features of the dermatoglyphics. By way of example, these morphological features may be the general shape of the dermatoglyphics (orientation of the loops, arches, whorls, etc.), in particular according to the categories of Henry Faulds, Francis Galton and Edward Henry, the overall profile of the ridges, the "minutiae" consisting of singular points along the ridges (termination of a ridge, bifurcation, etc.), the shape of the ridges, pores or even scars.

Among these morphological features, minutiae are the subject of particular attention because, due to their singularity, the comparison of minutiae between dactylograms contributes to providing probative value to any identification attempt. For example, according to Balthazar's rule, 17 or 18 common minutiae are sufficient to certify a match between two dactylograms, or, according to Locard's rule, dactyloscopic proof is achieved when two dactylograms exhibit no discrepancy and share 12 common minutiae.

It is common to classify minutiae into two categories: bifurcations and terminations. Bifurcations comprise right or left bifurcations, lakes and bridges. Terminations comprise right or left terminations, islands and hooks. However, this division into two categories has no normative or limiting character. There are other combinations thereof, and so a minutia is generally understood to mean any singular point and/or any discontinuity present along the ridges of the dermatoglyphics.

Minutiae are generally represented and stored in databases in the form of coordinates in a three-dimensional space, as described in particular in the ISO/IEC 19794-2: 2005 standard, Information Technology—Biometric Data Interchange Formats—Part 2: Finger Minutiae Data, 2005. The first two dimensions correspond, respectively, to the abscissa and the ordinate of the minutia in a reference system of the dactylogram. The third dimension corresponds to the angle of orientation of the minutia with respect to the horizontal axis of this same reference system. Thus, unlike dactylograms stored in the form of an image, the computerized storage of minutiae in this form requires less memory space. They also enable better database interoperability and reduce computing time during identification or authentication operations.

All of these advantages contribute to minutiae being adopted as first-choice features when processing dactylograms with a view to creating biometric identification databases, to the point that they are very often the only data available. In other words, in these databases, the images of the dactylograms are not stored, and only the geometric coordinates of the points constituting the minutiae are stored.

Methods and systems for identifying dactylograms are either manual, semi-automatic or fully automatic. Since the size of databases and the computing powers of data processing devices are constantly increasing, automated fingerprint identification systems (AFIS) based on the use of minutiae are increasingly being used. They make it possible to quickly and efficiently analyze a list of candidate dactylograms likely to correspond to a dactylogram whose owner is to be identified.

Automatic identification methods implemented by this type of system generally comprise two main steps. In a first step, use is made of one or more screening algorithms that make it possible to rapidly eliminate candidate dactylograms that share the fewest common features with the dactylogram whose owner it is sought to identify. In a second step, one or more algorithms, which are usually slower and more precise, compare said dactylogram with the remaining candidate dactylograms in order to establish a list of best matches.

Among automatic identification methods, those based on the implementation of neural networks generally require a preliminary step of encoding the dactylograms, be these provided in the form of images, lists of minutiae or a combination thereof. In this encoding step, the relevant distinguishing features of the dactylograms are extracted, selected and then transcribed into instructions able to be deciphered by a data processing device such as a computer and suitable for being subjected to computational and/or combinational operations. The encoding step is often an integral part of identification methods.

Su et al., MRA-GNN: Minutiae Relation-Aware Model over Graph Neural Network for Fingerprint Embedding. arXiv preprint arXiv:2307.16416, 2023 describes a method for encoding dactylograms based on their minutiae. In a first stage, the method encodes each minutia of each dactylogram of a plurality of candidate dactylograms into graphs representative of their topological relationships. In a second stage, each dactylogram is encoded as a graph representative of the correlation structures between nearest-neighbor dactylograms based on the graphs relating to each of their minutiae. This encoding is achieved using a graph neural network (GNN) implemented on the dactylograms provided in the form of images the minutiae in which are extracted using a pre-encoder. The graphs take the form of vectors.

The use of the method as a means of identification is limited. Indeed, it is suitable only for identifying a set of dactylograms comprising multiple dactylograms to be identified. Each of them has to be encoded as a graph beforehand using the same nearest-neighbor approach before being able to be compared with each candidate dactylogram via a criterion applied to the vector product of the vectors representative of their graph. In other words, the method is not suitable for the identification of a single and unique dactylogram provided as input datum.

Grosz et al., Minutiae-guided fingerprint embeddings via vision transformers. arXiv preprint arXiv:2210.13994, 2022 describes a method for encoding dactylogram images in the form of a fixed-size vector. The minutiae in each dactylogram image are first extracted and represented in the form of a two-channel heat map. Next, the channels of each heat map and the image of the corresponding dactylogram are concatenated together, flattened and supplied as input data to a vision transformer neural network, such as the one described in VASWANI et al. Attention is all you need. Advances in neural information processing systems, vol. 30, 2017. The identification of one dactylogram from a set of candidate dactylograms is achieved by comparing the encoded vectors, the result of which is combined with those from identification methods based on convolutional neural networks.

TANDON et al, Transformer based fingerprint feature extraction, 26th International Conference on Pattern Recognition (ICPR), 2022, describes a method for encoding a dactylogram image using a convolutional neural network based on a convolutional transformer approach. The method makes it possible to encode a general representation of the dactylogram, predict a list of minutiae and encode a local representation of the list of predicted minutiae. The identification of one dactylogram from a set of candidate dactylograms takes place in a number of conditional steps. The global representations of the dactylogram images are first compared. If the global similarity score is greater than a threshold value, the identification is validated. If it is lower, a local similarity score is computed based on the comparison of the local representations based on the minutiae. An average score is then established between the global similarity score and the local similarity score.

SUMMARY OF THE INVENTION

Technical Problem

A first drawback of methods for identifying dactylograms based on their images is that they require the dactylogram images to be available in existing databases. However, existing databases might not contain these, either for storage reasons or by choice. These methods may in particular be unsuitable for older databases in which only minutiae are available.

A second drawback of these image methods is their lack of interoperability. Since they are based on images, they may require a certain format and/or a certain quality of image. However, the format and quality of dactylogram images in existing databases may vary from one base to another. In order to be able to be implemented, these methods may therefore require particular adaptations depending on the specific features of each of the databases, reducing interoperability between these bases even more.

One drawback of methods for identifying dactylograms based on their minutiae encoded in graphs representative of their topological relationships is their insurmountable inability to identify a single and unique dactylogram from a set of candidate dactylograms. Moreover, they require making more or less arbitrary choices from a set of possibilities regarding nearest neighbors in order to construct correlation structures between dactylograms based on graphs relating to their minutiae. However, since the possibility space is practically infinite, making such choices necessarily implies neglecting certain solutions, some of which may prove to be optimal.

There is therefore still a need to improve methods for identifying dactylograms, more particularly methods for comparing dactylograms in pairs based on their minutiae, in order not only to reduce computing time during an identification operation, but also to ensure better interoperability of databases. In particular, there is a need for methods for identifying dactylograms that are capable of operating on any type of database comprising lists of minutiae and/or on systems whose storage capacities and/or computing resources are limited.

Technical Solution

According to a first aspect of the invention, provision is made for a computer-implemented method for comparing two dactylograms based on lists of their minutiae, said method taking, as input data, a first source matrix MS1 of the coordinates of each minutia in a first list L1 of 'n' minutiae of a first dactylogram in an O-dimensional space E and a second source matrix MS2 of the coordinates of each minutia in a second list L2 of 'm' minutiae of a second dactylogram in an O-dimensional space E, and supplying, as output datum, a score regarding a match between the two lists L1, L2 of minutiae, the method comprising the following steps:

(a) projecting each of the two source matrices MS1, MS2 into a P-dimensional space G, the number of dimensions P of the space G being greater than the number of dimensions O of the space E of the coordinates of each minutia, said projection being carried out using a projection model Proj, the projection model Proj being trained beforehand to form, from the source matrices MS1, MS2, the projected matrices MP1, MP2 of dimension (n, p) and (m, p), respectively;

(b) inferring two inference matrices MF1, MF2 respectively of dimensions (n+1, p) and (m+1, p), by applying a previously trained graph neural network to the projected matrices MP1, MP2;

(c) concatenating each of the inference matrices MF1 and MF2 with a vector V1, V2 of coordinates of a dummy minutia so as to form, respectively, enriched inference matrices MFE1, MFE2 of dimension (n+1, p) and (m+1, p), respectively;

(d) concatenating the two enriched inference matrices MFE1, MFE2 into an intermediate matrix MI of dimension (n+m+2, p);

(e) encoding the intermediate matrix MI into an encoding matrix ME of dimension (n+m+2, p) by applying a second previously trained graph neural network;

(f) aggregating the values of the intermediate matrix into a vector VE of fixed size (1, p) using a previously trained aggregation model;

(g) converting the fixed-size vector VE into a scalar number S using a conversion model, said scalar number being the score regarding a match between the two lists L1, L2 of minutiae.

Advantageous embodiments are described below.

According to a second aspect of the invention, provision is made for a data processing device comprising means for implementing the method according to any one of the embodiments of the first aspect of the invention.

According to a third aspect of the invention, provision is made for a computer program comprising instructions that, when the program is executed by a computer, cause the latter to implement the method according to any one of the embodiments of the first aspect of the invention.

According to a fourth aspect of the invention, provision is made for a storage medium comprising instructions that, when they are executed by a computer, cause the latter to implement the method according to any one of the embodiments of the first aspect of the invention.

According to a fifth aspect of the invention, provision is made for a system for comparing two dactylograms based on lists of their minutiae.

Advantages

A first advantage of the invention is that the identification or authentication of a dactylogram does not require any dactylogram image. It may therefore be used on any dactylogram database comprising lists of minutiae. In particular, it may be used on older databases that do not contain dactylogram images and on more recent databases comprising images from which minutiae are able to be extracted.

A second advantage of the invention is the possibility of comparing pairs of dactylograms in which the number of minutiae available for each of them is different. The method may then be implemented simultaneously on different databases comprising different numbers of minutiae and/or on lists of minutiae of different sizes within one and the same database. The interoperability of the databases is improved in terms of use thereof, including between older databases that do not contain dactylogram images and more recent databases comprising images from which minutiae are able to be extracted.

A third advantage of the invention is its insensitivity to the number and order of the minutiae in lists of minutiae supplied as input data. Statistical noise is reduced and the results of the identification operations are more precise.

BRIEF DESCRIPTION OF THE DRAWINGS

FIG. 1 is a graphical depiction of one example of a list of minutiae of a finger dactylogram.

FIG. 2 is a flowchart of the method according to the first aspect of the invention.

FIG. 3 is a schematic depiction of a depiction of a list of minutiae in the form of a source matrix.

FIG. 4 is a depiction of a data processing device according to the second aspect of the invention.

FIG. 5 is a graphical depiction of the false negative rate (FRR) as a function of the false positive rate (FAR) when comparing lists of encoded minutiae according to one exemplary embodiment of the invention.

DETAILED DESCRIPTION OF EMBODIMENTS

Figure 1:
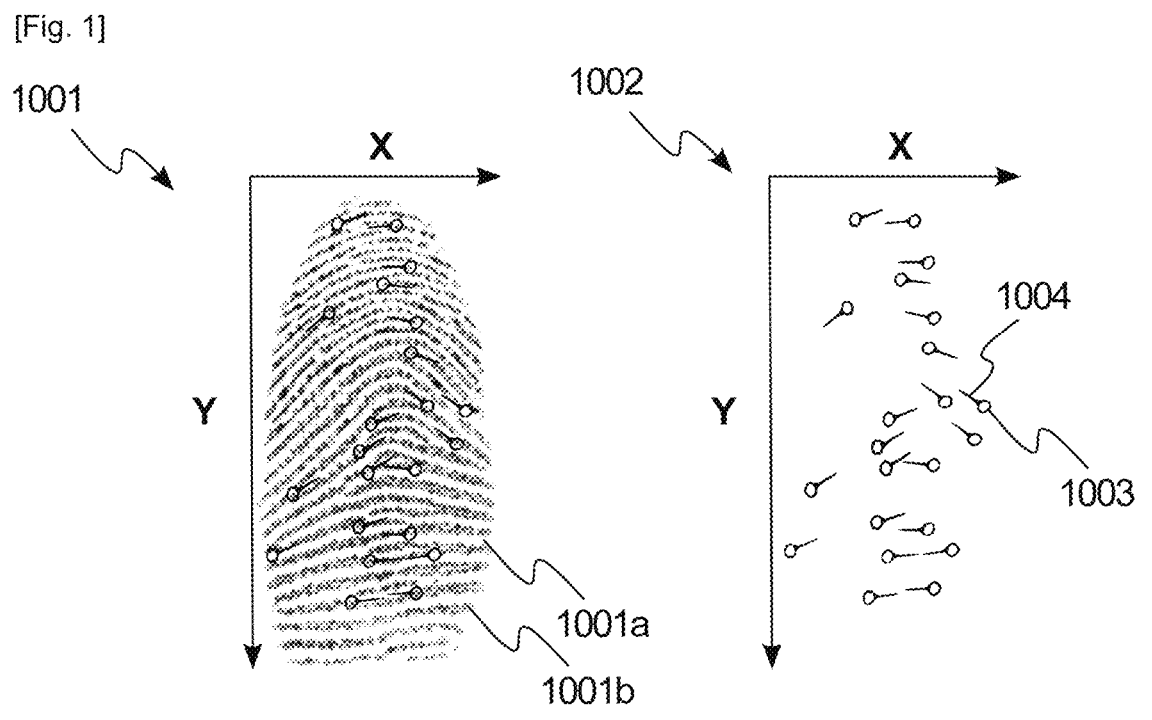

With reference to FIG. 1, a finger dactylogram 1001 is a pattern formed by traces left on surfaces by the dermatoglyphics of a finger. This drawing shows the curvatures of the furrows 1001a and ridges 1001b of the papillary or epidermal folds present on the tip of the finger. They generally form lines, loops and whorls.

The minutiae 1002 are singular points and/or discontinuities present along the ridges. In FIG. 1, they are represented by circles 1003 provided with a segment 1004. On the left-hand part of the figure, they are superimposed on the image of the dactylogram 1001. On the right-hand part, they are grouped together in the form of a cloud, without the image of the dactylogram.

The minutiae may be for example bifurcations such as right or left bifurcations, lakes and bridges, or terminations such as right or left terminations, islands and hooks. They may also be combinations of these various types.

According to the ISO/IEC 19794-2:2005 standard, Information Technology-Biometric Data Interchange Formats-Part 2: Finger Minutiae Data, 2005, it is common to reference each minutia 1002 by way of its coordinates in a three-dimensional space using a tuple or vector of dimension three $(1, 3)$. The first two dimensions of this tuple are the abscissa and the ordinate of the singular point representing the minutia 1002 in a Cartesian reference system X, Y of the dactylogram 1001, and the third dimension is the orientation angle of the ridge at the minutia with respect to the horizontal abscissa axis X. In FIG. 1, the abscissa and the ordinate of each minutia are represented by the circle 1003, and the orientation angle is represented by the segment 1004 attached to this circle.

According to a first aspect of the invention, with reference to FIG. 2, provision is made for a computer-implemented method 2000 for comparing two dactylograms based on lists of their minutiae, said method taking, as input data, a first source matrix MS1 of the coordinates of each minutia in a first list L1 of 'n' minutiae of a first dactylogram in an O-dimensional space E and a second source matrix MS2 of the coordinates of each minutia in a second list L2 of 'm' minutiae of a second dactylogram 1001 in an O-dimensional space E, and supplying, as output datum, a score regarding a match between the two lists L1, L2 of minutiae, the method 2000 comprising the following steps:

(a) projecting 2001 each of the two source matrices MS1, MS2 into a P-dimensional space G, the number of dimensions P of the space G being greater than the number of dimensions O of the space E of the coordinates of each minutia, said projection being carried out using a projection model Proj, the projection model Proj being trained beforehand to form, from the source matrices MS1, MS2, the projected matrices MP1, MP2 of dimension $(n, p)$ and $(m, p)$, respectively;

(b) inferring 2002 two inference matrices MF1, MF2 respectively of dimensions $(n, p)$ and $(m, p)$, by applying a previously trained graph neural network to the projected matrices MP1, MP2;

(c) concatenating 2003 each of the inference matrices MF1 and MF2 with a vector V1, V2 of coordinates of a dummy minutia so as to form, respectively, enriched inference matrices MFE1, MFE2 of dimension $(n+1, p)$ and $(m+1, p)$, respectively;

(d) concatenating 2004 the two enriched inference matrices MFE1, MFE2 into an intermediate matrix MI of dimension $(n+m+2, p)$;

(e) encoding 2005 the intermediate matrix MI into an encoding matrix ME of dimension $(n+m+2, p)$ by applying a second previously trained graph neural network;

(f) aggregating 2006 the values of the intermediate matrix into a vector VE of fixed size $(1, p)$ using a previously trained aggregation model;

(g) converting 2007 the fixed-size vector VE into a scalar number S using a conversion model, said scalar number being the score regarding a match between the two lists L1, L2 of minutiae.

In the context of the present invention, a "graph neural network" (GNN) is understood to mean a graph neural network as defined in the field of statistical or machine learning, in particular neural networks based on the use of feature vectors (embeddings) to encode the properties of each node (node embedding) and of each edge (edge embedding) as information able to be represented in the form of a graph.

In the context of the present invention, "coordinates of each minutia" are understood to mean the coordinates of any referencing system or format that makes it possible at least to characterize the position and the orientation of each minutia in an O-dimensional space E. This interpretation covers both the referencing system or format described in the ISO/IEC 19794-2:2005 standard, Information Technology-Biometric Data Interchange Formats-Part 2: Finger Minutiae Data, 2005, and any other system or format with equivalent functions that may differ therefrom.

According to one preferred embodiment, the space E is 3-dimensional (O=3) and the coordinates of the minutiae correspond respectively to the values of its abscissa, its ordinate and its orientation angle in the reference system (X, Y) of the dactylogram. The coordinates m of a minutia may be represented in the form of a tuple or vector of dimension (1, 3) in a three-dimensional space (O=3). These coordinates comprise the abscissa and the ordinate of the minutia in a Cartesian reference system X, Y of the dactylogram, and the orientation angle of the ridge at the minutia with respect to the horizontal abscissa axis.

For example, based on the referencing format described in the ISO/IEC 19794-2:2005 standard, Information Technology-Biometric Data Interchange Formats-Part 2: Finger Minutiae Data, 2005, with reference to FIG. 3, a list L1, respectively L2, of 'n', respectively 'm', minutiae may be represented in the form of a source matrix MS1, respectively MS2, of dimension (n, 3), respectively (m, 3), by concatenating their vectors of dimension (1, 3), the columns representing the abscissa 'x', the ordinate 'y' and the orientation angle 'a' of the minutia. In FIG. 3, for 'n' minutiae, the values of the abscissa, of the ordinate and of the angle of each minutia are concatenated vertically so as to form the n rows of the source matrix MS1.

In equivalent fashion, the arrangement of the values may be transposed: the values of the abscissa, of the ordinate and of the angle of each minutia are concatenated horizontally so as to form the n columns of the source matrix. For conciseness, in the remainder of this document, reference will be made solely to the arrangement of the values of the abscissa, of the ordinate and of the angle of each minutia in columns so as to form the n rows of the source matrix. A simple transposition operation makes it possible to change from one arrangement to the other.

In step (a), each of the two source matrices MS1, MS2 is subjected to a projection Proj into a P-dimensional space G, the number of dimensions P of the space G being greater than the number of dimensions O of the space E of the coordinates of each minutia. This projection is carried out using a projection model Proj trained beforehand to form projected matrices MP1, MP2 of dimension (n, p) and (m, p), respectively. It makes it possible to enrich the information relating to the coordinates of the minutiae with new dimensions that will then serve as a support for information inferred in steps (b) and (d) of inference carried out by the graph neural networks. The nature of the inferred information is determined during training of the projection model and that of the graph neural networks. For example, this additional information may, after training, be certain topological relationships or correlation structures between minutiae.

According to some embodiments, the projection model Proj is a projection matrix MP into a space G whose number P of dimensions is arbitrary, preferably into a space G of arbitrary dimension P of at least 32 times the dimensions O of the space E of the coordinates of each minutia. Proceeding from the previous example of the two source matrices MS1, MS2 of respective dimension (n, 3) and (m, 3), the projection model Proj may be a projection matrix of dimension (3, 128) that makes it possible to project said source matrices into a space G of dimension P of at least 32 times the dimension O=3 of the space E of the coordinates of the minutiae 1002. The projected matrix MP, obtained by applying the projection matrix to the source matrix via a simple matrix computation, has a dimension (n, 128). Both for this example and more generally, it should be emphasized that the dimension of the projection matrix does not depend on the number of minutiae of the source matrix.

In step (b), the two projected matrices MP1, MP2 are supplied, as input data, to a first previously trained graph neural network in order to infer inference matrices MF1 and MF2, respectively. The graph neural network and its training method are of any suitable type. The training method may in particular be unsupervised, supervised or self-supervised learning, or a combination thereof. In particular, it may be "identity" supervised learning in which the graph neural network is trained to classify each list of minutiae of a training set into its own identity or class. In other words, each list of minutiae in the training set is considered to be a unique identity or class during learning. The inference step (b) may be carried out successively on each of the projected matrices MP1, MP2 or simultaneously.

In step (c), each of the two inference matrices MF1 and MF2 is concatenated with a vector V1, V2 of coordinates of a dummy minutia MF of dimension (1, p). Proceeding from the previous example, the concatenation of the inference matrix MF1 with vector V1 of coordinates of a dummy minutia of dimension (1, 128) makes it possible to obtain an enriched inference matrix MFE1 of dimension (n+1, 128), and the concatenation of the inference matrix MF2 with vector V2 of coordinates of a dummy minutia of dimension (1, 128) makes it possible to obtain an enriched inference matrix MFE2 of dimension (m+1, 128).

The vectors V1, V2 of coordinates of a dummy minutia have the function of classification tokens, as are commonly used in graph neural networks, in particular in transformer graph neural networks. In this regard, see the articles by VASWANI et al. Attention is all you need. Advances in neural information processing systems, vol. 30, 2017 and DOSOVITSKIY et al. An image is worth 16×16 words: Transformers for image recognition at scale. arXiv preprint arXiv:2010.11929, 2020.

In step (d), the two enriched inference matrices MFE1, MFE2 are concatenated into a single intermediate matrix MI of dimension (n+m+2, p). Proceeding from the previous example, for two enriched inference matrices of respective dimension (n+1, 128) and (m+1, 128), the concatenation is carried out vertically so as to obtain an intermediate matrix of dimension (n+m+2, 128).

In step (e), the intermediate matrix MI is encoded. It is supplied, as input datum, to a second graph neural network trained beforehand to compute an encoding matrix ME. The second graph neural network and its training method are of any suitable type. The training method may in particular be unsupervised, supervised or self-supervised learning, or a combination thereof. In particular, it may be supervised learning in which the graph neural network is trained by minimizing a binary cross-entropy function, during which the lists of minutiae of two matching dactylograms form a first class denoted '1' and the lists of minutiae of different dactylograms form a second class denoted '0'.

In step (f), the values of the intermediate matrix MI are aggregated into a fixed-size encoding vector VE using a previously trained aggregation model. By way of illustration, proceeding from the example of the intermediate matrix of dimension (n+1, 128) described above, this aggregation consists in reducing said matrix to a single row so as to form a fixed-size vector of dimension (1, 128).

According to some embodiments, the aggregation model is an arithmetic mean, for each dimension P of the space G, of the values of the intermediate matrix MI. By way of illustration, with reference to FIG. 4 and proceeding from the previous example of the intermediate matrix MI of dimension (n+m+2, 128), each column corresponds to one of the P dimensions of the space G. The arithmetic mean of the values of the column is then taken for each of the 128 columns.

In step (g), the fixed-size encoding vector VE of dimension (1, p) is converted into a scalar number (of dimension (1, 1)) using a conversion model. The conversion model is of any suitable type. One example of a conversion model may be a projection matrix from a dimension (p, 1) to a dimension (1, 1), the result of the projection being a scalar.

According to some preferred embodiments, the conversion model comprises a sigmoid probability function for converting the scalar into a second scalar between 0 and 1. The second scalar represents the score regarding a match, expressed as a probability level, between the two lists L1, L2 of minutiae. A score close to 1 corresponds to a high degree of similarity between the two lists L1, L2; a score close to 0 corresponds to a high degree of disparity between the two lists L1, L2.

According to some preferred embodiments, the first and second graph neural networks are transformer neural networks. It is known from the prior art to implement this type of neuron on dactylogram images. In the context of the present invention, it has been observed, surprisingly, that this type of network, when implemented not on an image of minutiae but on their coordinates, achieves similar or even better performance in terms of contextual sequencing and encoding. The result is that, contrary to what was expected, the coordinates of the minutiae, which constitute information that is a priori less rich than dactylogram images with regard to their topological relationships, are sufficient to benefit from the performance of a transformer network while at the same time reducing complexity, the amount of data to be processed and computational load.

According to some advantageous embodiments, the first and second transformer neural networks comprise a succession of at least 9 multi-head self-attention mechanism layers alternating with a multi-layer perceptron neural network, and do not have positional encoding. The absence of positional encoding makes it possible to make the method insensitive to the permutation of the minutiae in the list of minutiae. In other words, the order in which the tuples of each minutia are arranged in a list of minutiae has no impact on the results of the encoding of said list. The multi-head self-attention mechanism layers are described in VASWANI, Ashish et al. Attention is all you need. Advances in neural information processing systems, vol. 30, 2017. Preferably, the first and second graph neural networks have transformer neural networks with an identical layer structure.

According to some embodiments, the method furthermore comprises, before step (a), a preliminary step of normalizing the coordinates of each minutia, in which the orientation angles are replaced by the values of their sine and their cosine. In other words, the value of the orientation angle of each minutia in the list of minutiae is replaced by two values corresponding respectively to the sine and the cosine of said angle, or to the cosine and the sine of said angle. Such a normalization step is particularly advantageous in that it makes it possible to reduce the sensitivity of the graph neural network when there is a change, between two or more minutiae, from an orientation angle of $359°$ to $0°$. In the specific context of encoding a list of minutiae, precision and reliability during inference of the inference matrix are improved significantly.

In the case where the coordinates of a minutia are represented in the form of a tuple or a vector, this preliminary normalization step leads to a change in the dimension of said tuple or vector, and therefore in the dimension O of the space E. By way of illustrative example, for a list of the coordinates of a minutia represented in the form of a tuple or a vector of dimension (1, 3) comprising the abscissa and the ordinate of the minutia in a Cartesian reference system X, Y of the dactylogram and the orientation angle of the ridge at the minutia with respect to the horizontal abscissa axis, at the end of this normalization step, this tuple or this vector becomes a tuple or a vector of dimension (1, 4). The dimension O of the space E is then equal to four. Among the four dimensions in a column, the first two correspond to the abscissa and the ordinate of the minutia in the Cartesian reference system X, Y of the dactylogram, and the third and fourth correspond to the sine, respectively cosine, and to the cosine, respectively sine, of the orientation angle.

The method according to the first aspect of the invention is computer-implemented. With reference to FIG. 4, in a second aspect of the invention, provision is made for a data processing device 4000 comprising means for implementing a method 2000 according to any one of the embodiments of the first aspect of the invention.

One example of a device may be a device responsible for automatically executing sequences of arithmetic or logic operations in order to carry out tasks or actions. This device, also called a computer, may comprise one or more central processing units (CPUs) and/or one or more graphics processing units (GPUs) 4001 and at least one control device designed to execute these operations. It may also comprise other electronic components such as input/output interfaces 4002, non-volatile or volatile storage devices 4003, and communication buses for transferring data between the internal components of the device or with external components. One of the input/output devices 4002 may be a user interface for human-machine interaction, for example a graphical user interface for displaying information understandable to humans.

According to a third aspect of the invention, provision is made for a computer program 14003 comprising instructions that, when the program is executed by a computer, cause the latter to implement a method 2000 according to any one of the embodiments of the first aspect of the invention.

Any type of compiled or interpreted programming language may be used to implement the steps of the method of the invention. The computer program may form part of a software solution, that is to say a collection of executable instructions, codes, scripts or the like and/or databases.

According to a fourth aspect of the invention, provision is made for a computer-readable recording medium 4003 comprising instructions that, when they are executed by a computer, cause the latter to implement a method 2000 according to any one of the embodiments of the first aspect of the invention.

The computer-readable recording medium 4003 is preferably a non-volatile memory, for example a hard disk or a semiconductor-based reader. It may be a removable storage medium or a non-removable storage medium forming part of a computer.

The computer-readable recording medium 4003 may also be a volatile memory inside a removable medium. This may facilitate the deployment of the invention in numerous production sites.

The computer-readable recording medium 4003 may form part of a computer used as a server from which executable instructions are able to be downloaded which, when they are executed by a computer, cause the computer to execute a method according to any one of the embodiments described in this document.

The computer program 14003 and the medium 4003 on which it is recorded may be implemented in a distributed computing environment, for example cloud computing. The instructions may be executed on a server to which one or more client computers are able to connect and provide data encoded as input data for a method according to any one of the embodiments of the first aspect of the invention. Once the data have been processed, the result may be downloaded onto and decoded on the client computer or be sent directly, for example, in the form of instructions.

According to a fifth aspect of the invention, provision is made for a system for comparing two dactylograms based on lists of their minutiae, said system comprising:

a storage medium on which there is recorded a database containing the coordinates associated with each minutia in a list of minutiae of each of the dactylograms of a set comprising at least one candidate dactylogram;

a data processing device, for example a computer, according to any one of the embodiments of the second aspect of the invention, and configured to communicate with the storage medium.

According to some embodiments, the system furthermore comprises a device for acquiring an image of a dactylogram, the device being configured to extract the coordinates of a list of minutiae based on the image of a dactylogram able to be obtained by said device.

The acquisition device is of any suitable type. Some non-limiting examples of acquisition devices are described in US 2012 014569 A1, IB KOREA LTD [KR], Jan. 19, 2012 and US 2017 046554 A1, NEC CORP [JP], Feb. 16, 2017.

Extracting the coordinates of a list of minutiae based on an image of a dactylogram is common practice. Some non-limiting examples of extraction methods are described in the articles BANSAL et al., Punam. Minutiae extraction from fingerprint images-a review. arXiv preprint arXiv:1201.1422, 2011, and MOHSEN et al., Automatic Fingerprint Recognition Using Minutiae Matching Technique for the Large Fingerprint Database. arXiv preprint arXiv:1304.2109, 2013. The acquisition devices from the prior art may easily be adapted so as to implement these methods, in particular via their own data processing unit or the addition of a dedicated data processing unit.

Example

In one exemplary embodiment, the method for comparing two dactylograms based on lists of their minutiae takes a first source matrix MS1 of the coordinates of each minutia in a first list L1 of 'n' minutiae of a first dactylogram in a 4-dimensional space E and a second source matrix MS2 of the coordinates of each minutia in a second list L2 of 'm' minutiae of a second dactylogram 1001 in a 4-dimensional space E. Said method comprises the following steps:

(a) projecting each of the two source matrices MS1 of dimension (n, 4) and MS2 of dimension (m, 4) using a projection matrix of dimension (4, 128) optimized (trained) beforehand to form the projected matrices MP1, MP2 of dimension (n, 128) and (m, 128), respectively;

(b) inferring two inference matrices MF1, MF2 respectively of dimensions (n, 128) and (m, 128), by applying a previously trained transformer graph neural network to the projected matrices MP1, MP2;

(c) concatenating each of the inference matrices MF1 and MF2 with a vector V1, V2 of coordinates of a dummy minutia of dimension (1, 128) so as to form, respectively, enriched inference matrices MFE1, MFE2 of dimension (n+1, 128) and (m+1, 128), respectively;

(e) encoding the intermediate matrix MI into an encoding matrix ME of dimension (n+m+2, 128) by applying a second previously trained transformer graph neural network;

(f) aggregating the values of the intermediate matrix using an arithmetic mean, for each of the 128 dimensions, so as to form a vector VE of fixed size (1, 128);

(g) converting the fixed-size vector VE into a scalar number S using a projection matrix of dimension (128, 1), followed by applying a sigmoid probability function, the scalar number having a value between 0 and 1.

The first and second transformer graph neural networks comprise a succession of 9 multi-head self-attention mechanism layers alternating with a multi-layer perceptron neural network, and do not have positional encoding. This type of structure is described in section 3.1 and illustrated in FIG. 1 of the Article VASWANI, Ashish et al. Attention is all you need. Advances in neural information processing systems, vol. 30, 2017.

The first graph neural network is trained using an "identity" supervised learning method. The second neural network is trained using a pairwise comparison supervised learning method. The projection matrix is trained using a gradient descent learning method. The training set is a set comprising lists of minutiae containing around 1 million 8 hundred thousand images of dactylograms in which there are at least 6 different images of the same dactylogram. In other words, the training set comprises lists of minutiae of six images of three hundred thousand different dactylograms.

The performance of the method was evaluated by carrying out comparisons of multiple dactylograms from a database of lists of minutiae of a plurality of dactylograms. The results of the evaluation are shown in FIG. 6, showing the change in the false negative rate (FRR) as a function of the false positive rate (FAR). For a threshold corresponding to 0.01% (10-2) false positives (FAR), the false negative (FRR) occurrence rate is only 2.5%. Such a rate value makes the method particularly advantageous for use as a second step of precise comparison of a dactylogram from a set of candidate dactylograms that have previously been subjected to a first screening step in an automatic identification method.

REFERENCES

Patent Literature

US 2012 014569 A1, IB KOREA LTD [KR], Jan. 19, 2012.
US 2017 046554 A1, NEC CORP [JP], Feb. 16, 2017.

Non-Patent Literature

F. Galton, Fingerprint Directories. London, MacMillan & Co, 1895.
Henry Faulds, Guide to fingerprint Identification, Tokyo,
   Hanley, 1905.
E. Henry, Classification and uses of finger prints, published
   by his majesty's stationery office, London, 1913.
ISO/IEC 19794-2:2005, Information Technology-Biometric
   Data Interchange Formats-Part 2: Finger Minutiae Data,
   2005.
BANSAL, Roli, SEHGAL, Priti, and BEDI, Punam. Minu-
   tiae extraction from fingerprint images-a review. arXiv
preprint arXiv:1201.1422, 2011.
MOHSEN, S. M., FARHAN, S. M., and HASHEM, M. M.
   A. Automatic Fingerprint Recognition Using Minutiae
   Matching Technique for the Large Fingerprint Database.
   arXiv preprint arXiv:1304.2109, 2013.
VASWANI, Ashish, SHAZEER, Noam, PARMAR, Niki, et
   al. Attention is all you need. Advances in neural infor-
   mation processing systems, vol. 30, 2017.
DOSOVITSKIY, Alexey, BEYER, Lucas, KOLESNIKOV,
   Alexander, et al. An image is worth 16×16 words: Transformers for image recognition at scale. arXiv preprint
   arXiv:2010.11929, 2020.
GROSZ, Steven A., ENGELSMA, Joshua J., RANJAN,
   Rajeev, et al. Minutiae-guided fingerprint embeddings via
   vision transformers. arXiv preprint arXiv:2210.13994, 2022.
TANDON, Saraansh and NAMBOODIRI, Anoop. Trans-
   former based fingerprint feature extraction. In: 2022 26th
   International Conference on Pattern Recognition (ICPR).
   IEEE, p. 870-876, 2022.
SU, Yapeng, ZHAO, Tong, and ZHANG, Zicheng. MRA-
   GNN: Minutiae Relation-Aware Model over Graph Neu-
   ral Network for Fingerprint Embedding. arXiv preprint
   arXiv:2307.16416, 2023.

The invention claimed is:

1. A computer-implemented method for comparing two dactylograms based on lists of their minutiae, said method taking, as input data, a first source matrix MS1 of the coordinates of each minutia in a first list L1 of 'n' minutiae of a first dactylogram in an O-dimensional space E and a second source matrix MS2 of the coordinates of each minutia in a second list L2 of 'm' minutiae of a second dactylogram in an O-dimensional space E, and supplying, as output datum, a score regarding a match between the two lists L1, L2 of minutiae, the method comprising the following steps:

(a) projecting each of the two source matrices MS1, MS2 into a P-dimensional space G, the number of dimensions P of the space G being greater than the number of dimensions O of the space E of the coordinates of each minutia, said projection being carried out using a projection model Proj, the projection model Proj being trained beforehand to form, from the source matrices MS1, MS2, the projected matrices MP1, MP2 of dimension (n, p) and (m, p), respectively;

(b) inferring two inference matrices MF1, MF2 respec- tively of dimensions (n, p) and (m, p), by applying a previously trained graph neural network to the pro- jected matrices MP1, MP2;

(c) concatenating each of the inference matrices MF1 and MF2 with a vector V1, V2 of coordinates of a dummy minutia so as to form, respectively, enriched inference matrices MFE1, MFE2 of dimension (n+1, p) and (m+1, p), respectively;

(d) concatenating the two enriched inference matrices MFE1, MFE2 into an intermediate matrix MI of dimen- sion (n+m+2, p);

(e) encoding the intermediate matrix MI into an encoding matrix ME of dimension (n+m+2, p) by applying a second previously trained graph neural network;

(f) aggregating the values of the intermediate matrix into a vector VE of fixed size (1, p) using a previously trained aggregation model; and (g) converting the fixed-size vector VE into a scalar number S using a conversion model, said scalar number being the score regarding a match between the two lists L1, L2 of minutiae, wherein n, m, p, O, and P are integer values greater than 0, and S has a value between 0 and 1.

2. The method as claimed in claim 1, such that the first and second graph neural networks are transformer neural net- works.

3. The method as claimed in claim 2, such that the first and second transformer neural networks comprise a succession of at least 9 multi-head self-attention mechanism layers alternating with a multi-layer perceptron neural network.

4. The method as claimed in claim 1, such that the aggregation model is an arithmetic mean, for each dimen- sion P of the space G, of the values of the intermediate matrix MI.

5. The method as claimed in claim 1, such that the space E is 3-dimensional and the coordinates of the minutiae correspond respectively to the values of its abscissa, its ordinate and its orientation angle in the reference system (X, Y) of the dactylogram, X and Y being two-dimensional Cartesian coordinate values.

6. The method as claimed in claim 1, such that it further- more comprises, before step (a), a preliminary step of normalizing the coordinates of each minutia, in which the orientation angles are replaced by the values of their sine and their cosine.

7. The method as claimed in claim 1, such that the projection model Proj is a projection matrix MP into a space G whose number P of dimensions is arbitrary, preferably into a space G of arbitrary dimension P of at least 32 times the dimensions O of the space E of the coordinates of each minutia.

8. The method as claimed in claim 1, such that the conversion model comprises a sigmoid probability function.

9. A data processing device for comparing two dactylo- grams based on lists of their minutiae, said method taking, as input data, a first source matrix MS1 of the coordinates of each minutia in a first list L1 of 'n' minutiae of a first dactylogram in an O-dimensional space E and a second source matrix MS2 of the coordinates of each minutia in a second list L2 of 'm' minutiae of a second dactylogram in an O-dimensional space E, and supplying, as output datum, a score regarding a match between the two lists L1, L2 of minutiae, the data processing device comprising one or more processors configured to:

(a) project each of the two source matrices MS1, MS2 into a P-dimensional space G, the number of dimensions P of the space G being greater than the number of dimensions (of the space E of the coordinates of each minutia, said projection being carried out using a projection model Proj, the projection model Proj being trained beforehand to form, from the source matrices MS1, MS2, the projected matrices MP1, MP2 of dimension (n, p) and (m, p), respectively;

(b) infer two inference matrices MF1, MF2 respectively of dimensions (n, p) and (m, p), by applying a previously trained graph neural network to the projected matrices MP1, MP2;

(c) concatenate each of the inference matrices MF1 and MF2 with a vector V1, V2 of coordinates of a dummy minutia so as to form, respectively, enriched inference matrices MFE1, MFE2 of dimension (n+1, p) and (m+1, p), respectively;

(d) concatenate the two enriched inference matrices MFE1, MFE2 into an intermediate matrix MI of dimension (n+m+2, p);

(e) encode the intermediate matrix MI into an encoding matrix ME of dimension (n+m+2, p) by applying a second previously trained graph neural network;

(f) aggregate the values of the intermediate matrix into a vector VE of fixed size (1, p) using a previously trained aggregation model; and (g) convert the fixed-size vector VE into a scalar number S using a conversion model, said scalar number being the score regarding a match between the two lists L1, L2 of minutiae, wherein n, m, p, O, and P are integer values greater than 0, and S has a value between 0 and 1.

10. A system for comparing two dactylograms based on lists of their minutiae, said system comprising:

a storage medium on which there is recorded a database containing the coordinates associated with each minutia in a list of minutiae of each of the dactylograms of a set comprising at least one candidate dactylogram;

a data processing device as claimed in claim 9 and configured to communicate with the storage medium.

11. The system as claimed in claim 10, furthermore comprising a device for acquiring an image of a dactylogram, and wherein the device is furthermore configured to extract the coordinates of a list of minutiae based on the image of a dactylogram able to be obtained using said acquisition device.

12. A non-transitory computer-readable recording medium comprising instructions that, when they are executed by a computer, cause the computer to implement the method for comparing two dactylograms based on lists of their minutiae, said method taking, as input data, a first source matrix MS1 of the coordinates of each minutia in a first list L1 of 'n' minutiae of a first dactylogram in an O-dimensional space E and a second source matrix MS2 of the coordinates of each minutia in a second list L2 of 'm' minutiae of a second dactylogram in an O-dimensional space E, and supplying, as output datum, a score regarding a match between the two lists L1, L2 of minutiae, the method comprising the following steps:

(a) projecting each of the two source matrices MS1, MS2 into a P-dimensional space G, the number of dimensions P of the space G being greater than the number of dimensions O of the space E of the coordinates of each minutia, said projection being carried out using a projection model Proj, the projection model Proj being trained beforehand to form, from the source matrices MS1, MS2, the projected matrices MP1, MP2 of dimension (n, p) and (m, p), respectively;

(b) inferring two inference matrices MF1, MF2 respectively of dimensions (n, p) and (m, p), by applying a previously trained graph neural network to the projected matrices MP1, MP2;

(c) concatenating each of the inference matrices MF1 and MF2 with a vector V1, V2 of coordinates of a dummy minutia so as to form, respectively, enriched inference matrices MFE1, MFE2 of dimension (n+1, p) and (m+1, p), respectively;

(d) concatenating the two enriched inference matrices MFE1, MFE2 into an intermediate matrix MI of dimension (n+m+2, p);

(e) encoding the intermediate matrix MI into an encoding matrix ME of dimension (n+m+2, p) by applying a second previously trained graph neural network;

(f) aggregating the values of the intermediate matrix into a vector VE of fixed size (1, p) using a previously trained aggregation model; and (g) converting the fixed-size vector VE into a scalar number S using a conversion model, said scalar number being the score regarding a match between the two lists L1, L2 of minutiae, wherein n, m, p, O, and P are integer values greater than 0, and S has a value between 0 and 1.

* * * * *